May 1, 1956  G. A. MARESH  2,743,754
TIRE CHAINS

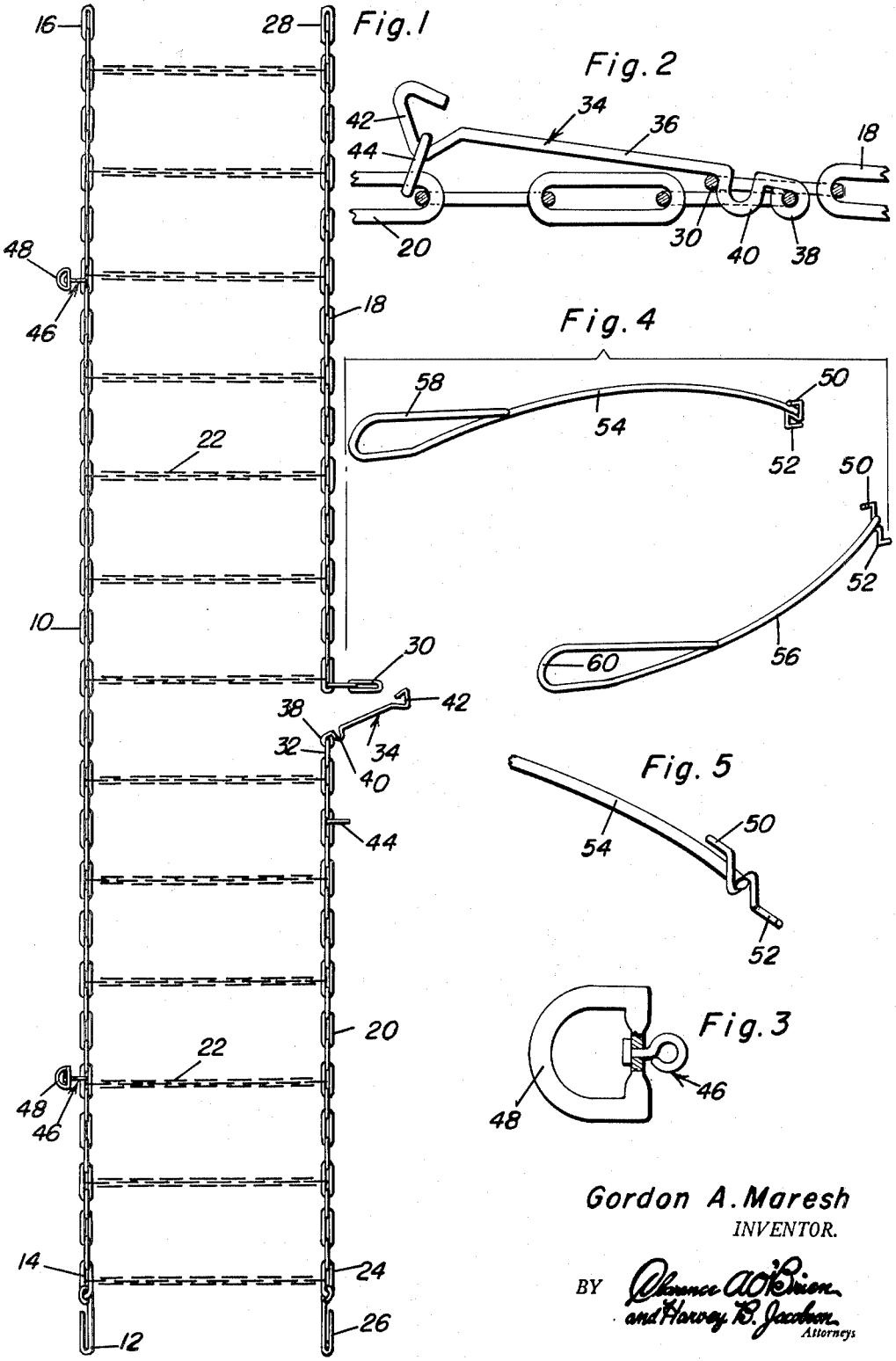

Filed June 5, 1953  2 Sheets-Sheet 2

Gordon A. Maresh
INVENTOR.

BY *Clarence A. O'Brien
and Harvey B. Jacobson*
Attorneys

United States Patent Office 2,743,754
Patented May 1, 1956

2,743,754
TIRE CHAINS

Gordon A. Maresh, Eau Claire, Wis.

Application June 5, 1953, Serial No. 359,906

3 Claims. (Cl. 152—213)

This invention relates to new and useful improvements in tire chains and the primary object of the present invention is to provide a tire chain which may be quickly and readily engaged over a vehicle tire without the necessity of having to raise the tire or move the vehicle forwardly or rearwardly.

Another important object of the present invention is to provide a tire chain including a circumferential chain having swivels attached thereto which are engageable with a pair of handles, the handles being employed for manipulating the tire chain to engage the circumferential chain over and behind a vehicle tire.

A further object of the present invention is to provide a tire chain so constructed as to permit the ends of the chains to be coupled from outside a vehicle tire whereby preventing the person installing the chain from contacting dirt, grease or the like on the inside of a vehicle tire.

A still further aim of the present invention is to provide a tire chain that is extremely simple and practical in construction, strong and reliable in use, efficient and durable in operation, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the present invention;

Figure 2 is an enlarged detail vertical sectional view showing the manner in which the inner adjacent ends of the inner circumferential tire chain sections are coupled together;

Figure 3 is an enlarged elevational view of one of the swivels used in the invention;

Figure 4 is a group perspective view of the two manipulating handles used in the present invention;

Figure 5 is a fragmentary enlarged view of one end of one of the manipulating handles shown in Figure 4;

Figure 6:
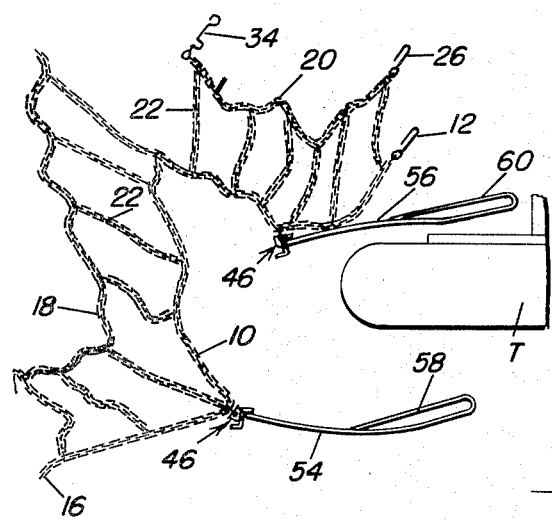
Figure 6 is a diagrammatic view showing the initial step in placing the present invention about a tire.
Figure 7:
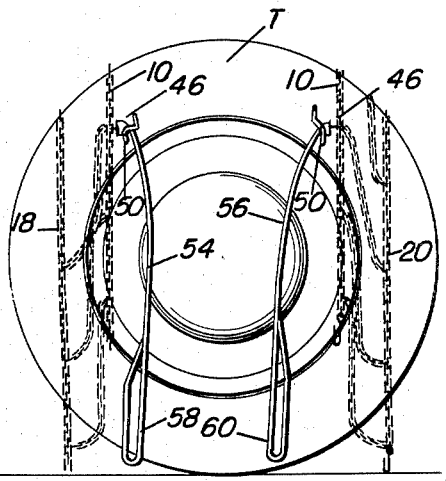
Figure 7 illustrates another step followed in engaging the tire chain with the vehicle tire.

Referring now to the drawings in detail, wherein for the purpose of illustration, there is a chain or elongated articulated member having a hook 12 secured to one of its end links 14 which is engageable with the other end link 16 of the chain 10 in order that the chain 10 may extend circumferentially about a tire.

A second circumferential chain or elongated articulated member composed of two sections 18 and 20 is connected to the chain 10 by a suitable number of cross-chains 22. The end links of the cross-chains 22 are engaged with longitudinally spaced links of the chain 10 and sections 18 and 20 as shown in Figure 1. The outer end link 24 of chain section 20 supports a hook 26 that is engageable with the outer end link 28 of chain section 18.

Means is provided for removably coupling the adjacent inner end links 30 and 32 of the chain sections 18 and 20 together. This means comprises a wire hook 34 whose shank 36 is provided with an eye 38 at one end. The shank 36 is provided with a detent or laterally projecting U-shaped portion 40 adjacent its eye 38 that is intended to be engaged in the opening of end link 30 as shown in Figure 2, when the bight portion 42 of the hook is engaged with a ring 44 slidably carried by a link of section 20 which is spaced several links from link 32.

A pair of swivels 46 are secured to chain 10 adjacent the end portions of the chain 10 and include eyes 48 which are removably engaged with the hooks 50 of oppositely disposed hooks 50 and 52 at the outer ends of curved wire handles 54 and 56. The inner ends of the handles 54 and 56 are looped upon themselves to form handgrips 58 and 60.

The present invention may also be employed as an emergency chain by reducing the number of cross-chains 22 illustrated. When such a construction is followed, the cross-chains 22 will be spaced apart approximately 10 inches, this depending upon the size of the vehicle tire.

Figure 8:
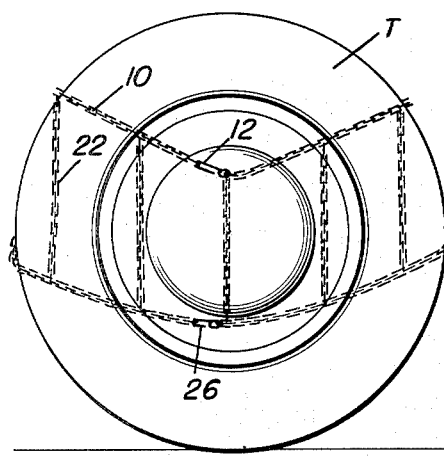
Figure 8 is a diagrammatic view following in sequence the views of Figures 6 and 7 and showing the manner in which the hooks carried by an end link of the two circumferential chains are engaged with end links at the other ends of the circumferential chains.
Figure 9:
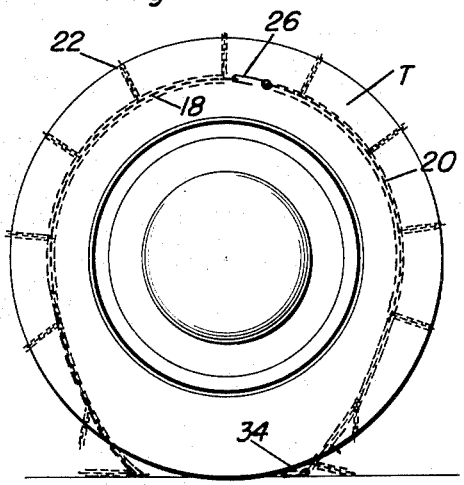
Figure 9 is a diagrammatic view showing the final step in placing the tire chain about a vehicle tire.

In practical use of the present invention, the hooks 50 of the handles 54 and 56 are engaged with the eyes 48 and swivels 46 and the entire chain is slipped over the vehicle tire T by the handles 54 and 56 with the handle 56 located behind the tire T and the handle 54 located outwardly therefrom. Then by grasping the hand-grips 58 and 60, the chain 10 is slipped forwardly over the tire T and hook 12 is engaged with link 16 also hook 26 is engaged with link 28 as shown in Figure 8.

The hooks 52 of handles 54 and 56 are then engaged with spaced links of chain 10 and chain 10 slipped upwardly, over and behind the tire T which will cause the links 30 and 32 to drop in front of the tire. It is then merely necessary to engage bight portion 42 with ring 44.

What is claimed as new is as follows:

1. A tire chain comprising a first circumferential chain having releasable end couplings, a second circumferential chain of two sections having spaced inner adjacent ends, cross-chains connecting the two sections to the first chain, said pair of sections having outer ends, and means for coupling the outer ends of said pair of sections together, releasable coupling means between the inner adjacent ends of said pair of sections, and swivels carried by said first chain adjacent the ends thereof whereby the first chain may be engaged by handle means for positioning the first chain over and behind a tire.

2. A tire chain comprising a first circumferential chain having releasable end couplings, a second circumferential chain of two sections having spaced inner adjacent ends, cross-chains connecting the two sections to the first chain, said pair of sections having outer ends, and means for coupling the outer ends of said pair of sections together, releasable coupling means between the inner adjacent ends of said pair of sections, hook engaging eyes, and swivels securing said eyes to said first chain adjacent the ends of the first chain whereby said first chain may be engaged by handle means for positioning the first chain over and behind a wheel.

3. An anti-skid device for vehicle tires, said device comprising a first circumferential chain having a hook at one end that is engageable with the link at the other end of the chain, a second circumferential chain composed of two sections having inner ends which are spaced apart, a hook carried by the outer end of one of the sections and engageable with the link at the outer end of the other section, cross-chains connecting said sections to said first chain, means releasably coupling the inner ends of said sections together, and swivels carried by said first chain adjacent the ends thereof whereby said first chain may be engaged by handles for positioning the first chain over a vehicle tire.

References Cited in the file of this patent

UNITED STATES PATENTS

| | | |
|---|---|---|
| 1,417,500 | Pendleton | May 30, 1922 |
| 1,989,217 | Sisk | Jan. 29, 1935 |
| 2,217,498 | Shepherd et al. | Oct. 8, 1940 |
| 2,332,113 | Reed | Oct. 19, 1943 |
| 2,588,568 | Peterson | Mar. 11, 1952 |

FOREIGN PATENTS

| | | |
|---|---|---|
| 118,795 | Great Britain | Sept. 12, 1918 |